United States Patent
Pellegrino et al.

(10) Patent No.: US 9,098,693 B2
(45) Date of Patent: Aug. 4, 2015

(54) OPTIONS DETECTION IN SECURITY PROTOCOLS

(75) Inventors: Giancarlo Pellegrino, Walldorf (DE); Keqin Li, Walldorf (DE); Luca Compagna, Walldorf (DE)

(73) Assignee: SAP SE, Walldorf, DE (US)

( * ) Notice: Subject to any disclaimer, the term of this patent is extended or adjusted under 35 U.S.C. 154(b) by 279 days.

(21) Appl. No.: 13/542,258

(22) Filed: Jul. 5, 2012

(65) Prior Publication Data

US 2014/0013382 A1    Jan. 9, 2014

(51) Int. Cl.
G06F 21/41    (2013.01)
G06F 21/57    (2013.01)
H04L 29/06    (2006.01)

(52) U.S. Cl.
CPC .............. *G06F 21/41* (2013.01); *G06F 21/577* (2013.01); *H04L 63/1433* (2013.01); *H04L 63/20* (2013.01); *G06F 21/57* (2013.01)

(58) Field of Classification Search
None
See application file for complete search history.

(56) References Cited

PUBLICATIONS

Armando et al.—2011 NPL—Automatic Security Analysis of SAML-based Single Sign-On.*
Gao et al. NPL 2011—Modeling and Verifying of Grid Computing Based on FSM; src: http://www.aicit.org/jcit/ppl/19-JCIT1-780285(Revised).pdf; 780285(Revised).pdf; obtianed date: Oct. 17, 2014.*
Angluin, "Computational Learning Theory: Survey and Selected Bibliography", Proceedings of the twenty-fourth annual ACM symposium on Theory of Computing, STOC '92, 1992, pp. 351-369.
Armando, et al, "Formal Analysis of SAML 2.0 Web Browser Single Sign-On: Breaking the SAML-based Single Sign-On for Google Apps", Proceedings of the 6th ACM Workshop on Formal Methods in Security Engineering, 2008, pp. 1-10.
Caballero, et al, "Fig: Automatic fingerprint generation", 14th Annual Network and Distributed System Security Conference, 2007, 16 pages.
Lee, et al, "Principles and methods of testing finite state machines—a survey", Proceedings of the IEEE, Aug. 1996, 64 pages.
Sabahi, et al, "Intrusion detection: A survey", 3rd International Conference on Systems and Networks Communications, Oct. 2008, pp. 23-26.
Yuan, et al, "Context-based online configuration-error detection", Proceedings of the 2011 USENIX conference on USENIX annual technical conference, 2011, 14 pages.

* cited by examiner

*Primary Examiner* — Jung Kim
*Assistant Examiner* — Tri Tran
(74) *Attorney, Agent, or Firm* — Brake Hughes Bellermann LLP (57) ABSTRACT

The embodiments provide an apparatus for detecting configuration options including an option detector configured to receive a basic model of a security protocol and a set of options, where each option is a variation of the basic model. The option detector is configured to detect which options are configured in an implementation of at least one at least one security protocol entity based on the basic model and the set of options.

20 Claims, 4 Drawing Sheets

OPTIONS DETECTION IN SECURITY PROTOCOLS

BACKGROUND

Modern security protocols are highly flexible and configurable. Many options may be implemented and configured, and these options may have a strong impact on the security of the systems that employ these implementations. One example of a security protocol is Security Assertion Markup Language (SAML) Single Sign-On (SSO) (hereinafter referred to as SAML SSO). The SAML SSO protocol may define an XML-based format for encoding security assertions as well as a number of protocols and bindings that prescribe how the assertions should be exchanged in a wide variety of applications and/or deployment scenarios. Typically, this is done to the minimum extent necessary to guarantee the interoperability among different implementations. As a consequence, the SAML SSO protocol may have a relatively large number of configuration options ranging from optional fields in messages, the usage of different communication channels, encryption and/or digital signature options for sensitive message elements. These options as well as other configuration options may need to be instantiated according to the requirements posed by the application scenario and the available security mechanisms.

Vendors of a security protocol such as the SAML SSO protocol, while striving to meet the requirements posed by their application scenario, may overlook the security implications associated with the choice of some configuration options, which may have negative consequences on the security of the application. Also, the SAML SSO protocol may be applied in complex heterogeneous landscapes usually including entities (e.g., server provider entities, identity provider entities, etc.) belonging to different organizations. Further, some of these organizations may employ an implementation of these entities provided by third parties such that the implementation details may be difficult to access.

SUMMARY

Embodiments provide an apparatus for detecting configuration options including an option detector configured to receive a basic model of a security protocol and a set of options, where each option is a variation of the basic model. The option detector is configured to detect which options are configured in an implementation of at least one at least one security protocol entity based on the basic model and the set of options.

According to one embodiment, the at least one security protocol entity is a service provider (SP) having a Security Assertion Markup Language (SAML) protocol. According to another embodiment, the at least one security protocol entity is an identity provider (IDP) having a Security Assertion Markup Language (SAML) protocol.

The set of options may include a different channel property for a communication channel in the basic model, a different channel for receiving or sending a message in the basic model, a different type of input message used in the basic model, a different type of output message used in the basic model, and/or a different condition in the basic model. The communication channel may be a Dolev-Yao channel or a unilateral Secure Socket Layer (SSL) channel.

The option detector may include a test case generator configured to receive the basic model of the at least one security protocol entity and the set of options and generate a test case from the basic model for each option of the set of options, a test case execution engine configured to execute each test case having a corresponding option, and generate results for each test case indicating whether or not the corresponding option has been detected, and a model synthesizer configured to update the basic model with one or more options that have been detected. The apparatus may further include a model checker configured to check whether expected security properties are satisfied in the updated basic model.

The embodiments also provide a method for detecting configuration options performed by one or more processors. The method may include receiving a basic model of a security protocol and a set of options, where each option is a variation of the basic model, and detecting which options are configured in an implementation of at least one at least one security protocol entity based on the basic model and the set of options.

The at least one security protocol entity may be a service provider (SP) having a Security Assertion Markup Language (SAML) protocol. The at least one security protocol entity may be an identity provider (IDP) having a Security Assertion Markup Language (SAML) protocol.

The set of options may include a different channel property for a communication channel in the basic model, a different channel for receiving or sending a message in the basic model, a different type of input message used in the basic model, a different type of output message used in the basic model, and/or a different condition in the basic model. The communication channel may be a Dolev-Yao channel or a unilateral Secure Socket Layer (SSL) channel.

The detecting step may further include generating a test case from the basic model for each option of the set of options, executing each test case having a corresponding option, generating results for each test case indicating whether or not the corresponding option has been detected, and updating the basic model with one or more options that have been detected. The method may further include checking whether expected security properties are satisfied in the updated basic model.

The embodiments also provide a computer program product tangibly embodied on a non-transitory computer-readable storage medium and including executable code that, when executed, is configured to cause a data processing apparatus to receive a basic model of a security protocol and a set of options, where each option is a variation of the basic model, and detect which options are configured in an implementation of at least one at least one security protocol entity based on the basic model and the set of options.

The at least one security protocol entity may be a service provider (SP) having a Security Assertion Markup Language (SAML) protocol. Also, the at least one security protocol entity may be an identity provider (IDP) having a Security Assertion Markup Language (SAML) protocol.

The set of options may include a different channel property for a communication channel in the basic model, a different channel for receiving or sending a message in the basic model, a different type of input message used in the basic model, a different type of output message used in the basic model, and/or a different condition in the basic model.

The executable code may include instructions to generate a test case from the basic model for each option of the set of options, execute each test case having a corresponding option, generate results for each test case indicating whether or not the corresponding option has been detected, and update the basic model with one or more options that have been detected. The executable code may include instructions to check whether expected security properties are satisfied in the updated basic model.

The details of one or more implementations are set forth in the accompanying drawings and the description below. Other features will be apparent from the description and drawings, and from the claims.

DETAILED DESCRIPTION

The embodiments provide a mechanism that detects security protocol options in an implementation of one or more security protocol entities such as an identity provider (IdP) and/or a service provider (SP). The detection of security protocol options may include automatically generating test cases based on a basic model of the security protocol and one or more possible options (or variations of the basic model), where each test case relates to a different option. Thereafter, each test case may be executed in order to determine whether or not the corresponding option has been detected. Also, the mechanism may synthesize the basic model with one or more options that have been detected. As a result, these techniques may be used to detect options of third-party implementations that are engaged with a particular enterprise in a common landscape. Further, when the options are detected, a security analyst can estimate the concrete risks that the enterprise is exposed in the security protocol environment. In addition, the synthesized model may be used to undertake a deeper security analysis in order to investigate whether the environment can meet specific security requirements.

Figure 1:
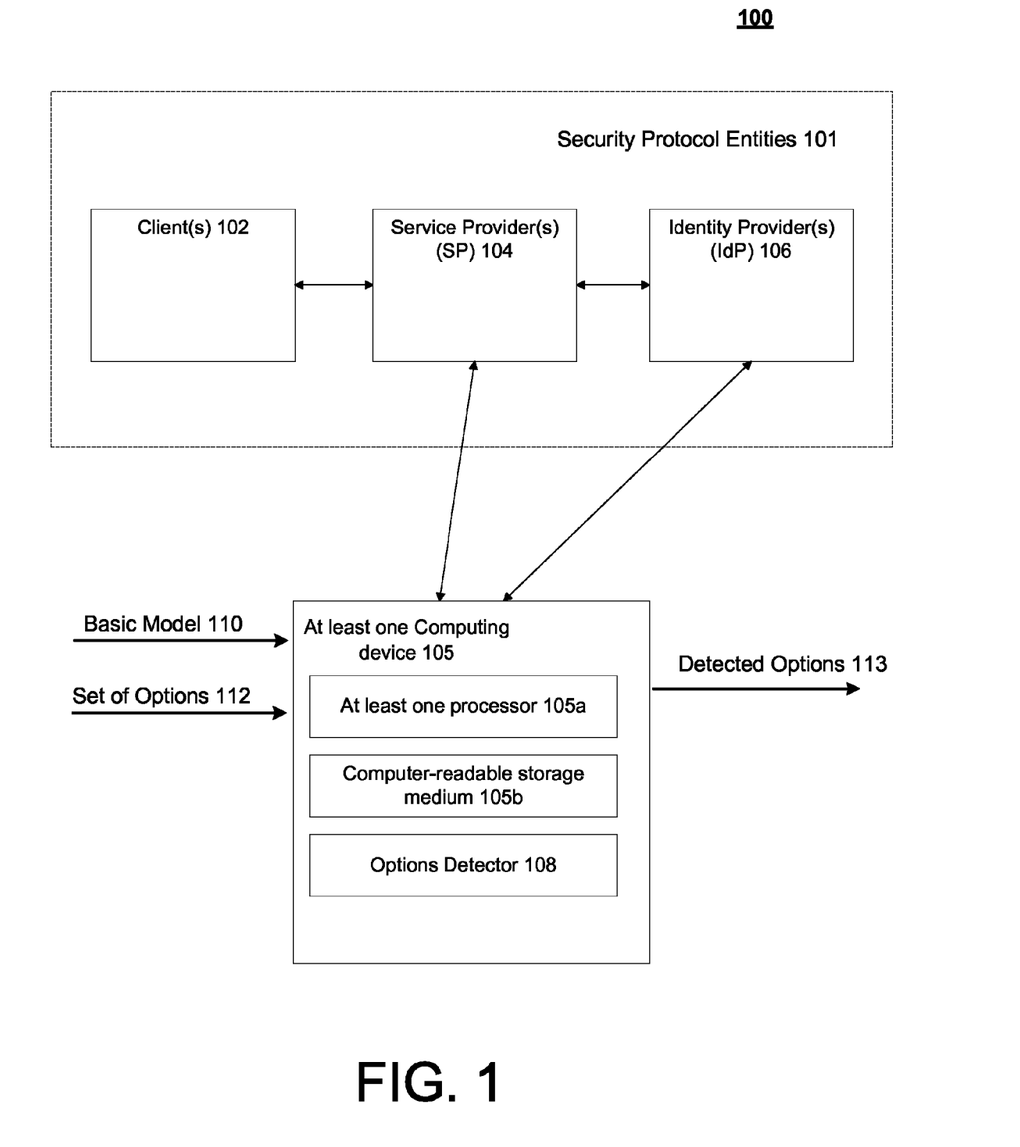
FIG. 1 illustrates a system for detecting configuration options in an implementation of one or more security protocol entities according to an embodiment.

FIG. 1 illustrates a system 100 for detecting configuration options in an implementation of one or more security protocol entities 101 according to an embodiment. The system 100 may include a plurality of security protocol entities 101 such as one or more clients 102, one or more service providers (SPs) 104, and one or more identity providers (IdPs) 106. The clients 102, the service providers 104 and the identity providers 106 may be implemented according to a security protocol such as the SAML SSO protocol. Although the embodiments are discussed with reference to the SAML SSO protocol, the embodiments encompass any type of security protocol known in the art. As such, the security protocol entities 101 may be security protocol entities other than the clients 102, the service providers 104 and/or the identity providers 106, and the same techniques may be applied to these other entities.

Generally, the clients 102 may include one or more web browsers that may be guided by users. However, the clients 102 may represent any type of application that is capable of running on an operating system of a computing device and is able to connect to a network such as the Internet. The service providers 104 may be any type of enterprise that provides communications, storage, processing, and/or other services, for example. The identity providers 106 may be any type of authentication module known in the art. According to one example, a client 102 (e.g., a web browser guided by a user) may wish to receive access to a service or a resource provided by a service provider 104. An identity provider 106 may authenticate the client 102 and generate corresponding authentication assertions. The service provider 104 may use the authentication assertions generated by the identity provider 106 to provide the client 102 access to the requested service or resource. The communication exchanges between the clients 102, the service providers 104, and/or the identity providers 106 may occur over one or more communication channels. The clients 102, the service providers 104, and the identity providers 106 and their operations are well known in the art, and therefore only the details which are relevant to the embodiments will be discussed herein.

According to the embodiments, the system 100 may include an options detector 108 executing on at least one computing device 105. As shown in FIG. 1, the options detector 108 is illustrated as executing in the context of at least one computing device 105. As also shown, the at least one computing device 105 may include at least one processor 105a, and associated computer readable storage medium 105b. Thus, the computer readable storage medium 105b may be configured to store instructions which, when executed by the at least one processor 105a, results in execution of the options detector 108 and associated operations thereof. Further, as shown in more detail in FIGS. 2A and 2B, the options detector 108 may include subcomponents. The subcomponents may also be executing on the at least one computing device 105 in the same manner.

The options detector 108 may be configured to receive a basic model 110 of the security protocol and a set of options 112 and detect which options among the set of options 112 are configured in the implementation of one or more of the security protocol entities 101 such as the service providers 104 and the identity providers 106. The basic model 110 of the security protocol may include the basic model of the entities that comprise the security protocol such as the clients 102, the service providers 104 and the identity providers 106. A portion of the basic model 110 is illustrated with respect to FIG. 3, which is explained later in the disclosure. The set of options 112 may be options to be detected in an implementation of one or more security protocol entities. For example, the set of options 112 may be variations of properties of a communication channel between the entities, the use of different communication channels for receiving various inputs/outputs, the generation of different types of output messages (e.g., a signed output message vs. an unsigned output message), the receiving of different types of input messages (e.g., receiving signed responses vs. receiving unsigned responses), and/or using different types of guards (or conditions) for evaluating responses. More generally, each option of the set of options 112 may be a variation of the basic model, which may be virtually any type of configuration option.

The options detector 108 may be embodied on a physical server associated with one or more of the security protocol entities or may be embodied on an independent physical server that is connected to one of more of the clients 102, service providers 104 and the identity providers 106. The underlying physical server may include one or more processors and memory units for the storage of executable instructions for carrying out operations of the options detector 108. The options detector 108 may be configured to analyze the implementation of one or more of the security protocol entities (e.g., the service provider 104 and/or the identity provider 106) based on the basic model 110 and the set of options 112 and determine whether or not one or more of the set of options 112 are detected in the security protocol implementation. As result, the options detector 108 may determine detected options 113, and may update the basic model 110 of the security protocol with the detected options 113, as further explained below.

Figure 2A:
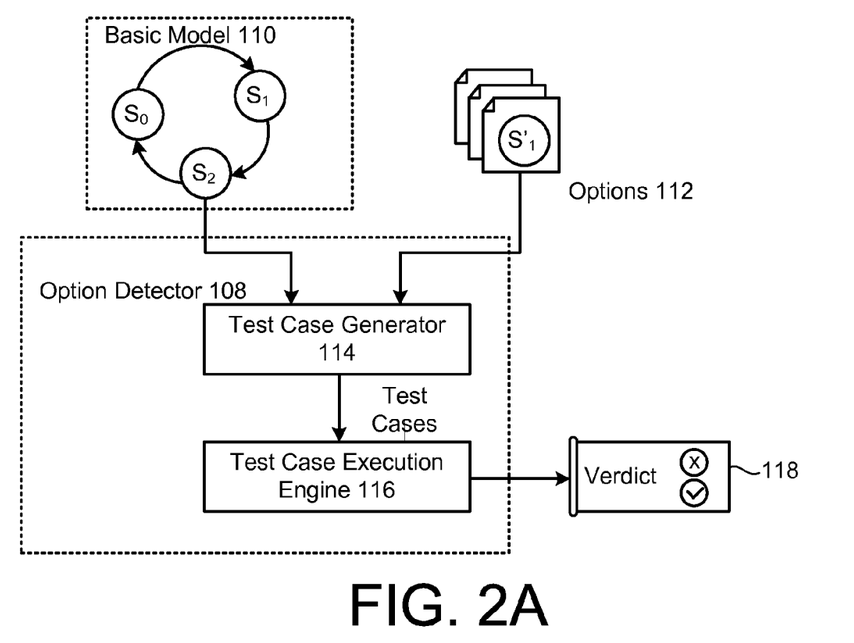
FIG. 2A illustrates an option detector of the system of FIG. 1 according to an embodiment.

FIG. 2A illustrates the options detector 108 according to an embodiment. The options detector 108 may include a test case generator 114 and a test case execution engine 116. The test case generator 114 may be configured to receive the basic model 110 and the set of options 112 and generate a plurality of test cases. For instance, the test case generator 114 may be configured to extract a test case from the basic model for each option of the set of options 112, where each test case corresponds to a different option in the set of options 112. In one embodiment, the test case generator 114 generates a test case from the basic model for a given option according to a model checker technique. For example, the model checker technique may refer to a technique for automatically verifying correctness of properties in a finite-state system. In particular, given a model of the system (which is further described below), the test case generator 114/test case execution engine 116 may automatically test whether this model having the option meets a given specification. However, other techniques or algorithms besides the model checker technique may be utilized by the test case generator 114.

The test case execution engine 116 may be configured to execute the test cases, and generate results such as verdict 118 indicating whether the options have been detected. For example, the test case execution engine 116 may execute a test case corresponding to a particular option, and then generate the verdict 118 which indicates whether or not the particular option has been detected. The test case execution engine 116 may then repeat this process for each of the test cases. The execution of a test case is performed by parsing first the test case and then interpreting it. If during the execution no errors occur, then the test passes otherwise it fails. In the context of the embodiments, the test cases are generated for detecting options, and if such test cases are executed with no errors, then the options are detected.

Figure 2B:
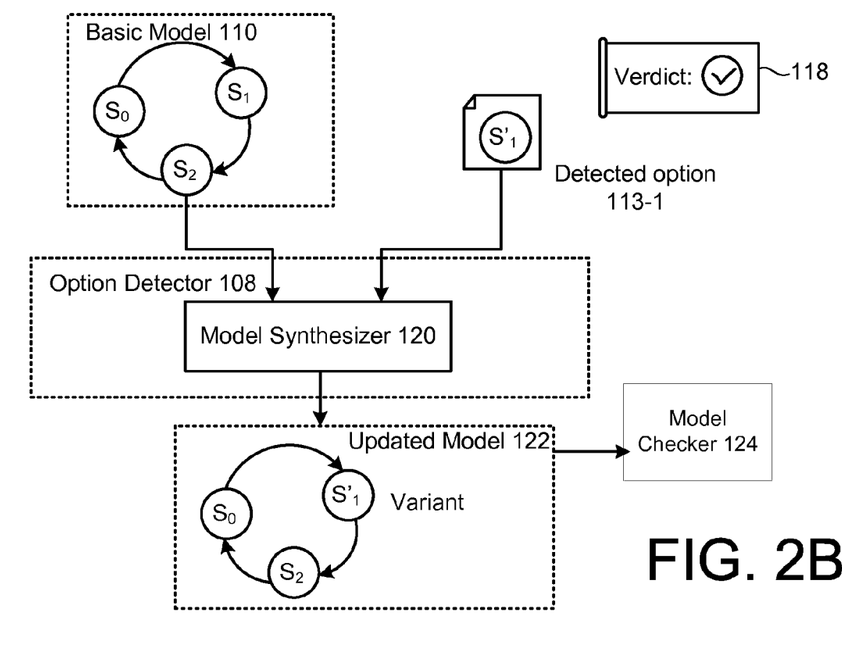
FIG. 2B illustrates an option detector of the system of FIG. 1 according to another embodiment.
Figure 4:
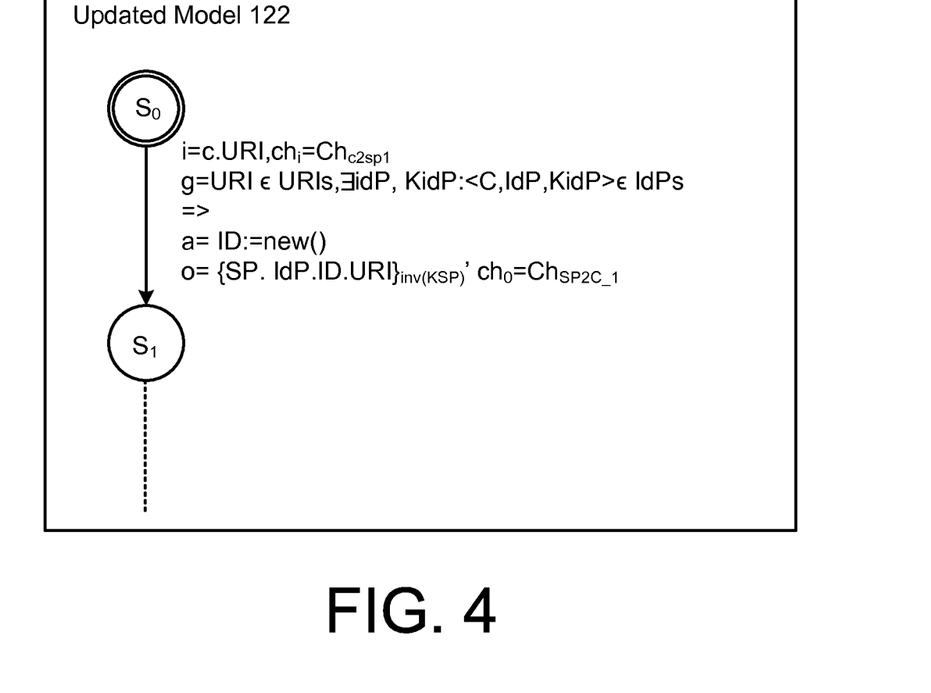
FIG. 4 illustrates a portion of an updated model according to an embodiment.

FIG. 2B illustrates the options detector 108 according to another embodiment. For example, the options detector 108 may also include a model synthesizer 120 that is configured to synthesize (or update) the basic model 110 with the detected options 113. In the example of FIG. 2B, option 113-1 has been detected by the test case execution engine 116. As such, the model synthesizer 120 may receive the basic model 110 and the detected options 113 such as the option 113-1 and synthesize the basic model 110 to generate an updated model 122 having the detected options 113 including the option 113-1. A portion of the updated model 122 is illustrated in FIG. 4, which is explained later in the disclosure. Also, the system may include a model checker 124 configured to check whether expected security properties are satisfied in the updated basic model 122. Given a model and a security property, the model checker 124 explores the state-space of the model looking for violation(s) of the security property. If a violation occurs, the model checker 124 returns the sequence of steps it performed in order to reach the faulty state.

Before discussing the details of the basic model 110 with respect to FIG. 3, a number of definitions and principles regarding the formal model used to represent the security protocol entities will be discussed below.

Protocols messages may be transmitted between the client 102 and the service provider 104, the service provider 104 and the identity provider 106, and/or any other combination of clients 102, service providers 104 and identity providers 106. A protocol message M may be recursively defined as 1) an atom (which may be a variable or a constant), 2) encryption of a message M with a key K as $\{M\}_K$, 3) digital signature of a message M with a private key inv (PK) as $\{M\}_{inv(PK)}$, and 4) concatenation of messages $M_1$ and $M_2$ as $M_1 \cdot M_2$. Given a set of atoms A, L(A) is denoted as the message type and also the set of messages formed using atoms in A.

In the explanation provided below, the protocol messages may be transmitted via two different types of communication channels—Dolev-Yao (DY) channels and unilateral Secure Sockets Layer (SSL) channels. DY channels may be channels under the control of attacker modeling plain-text sockets that SAML SSO entities use to communicate. The term dy(ch) is used to denote that a channel ch is a DY channel. Unilateral SSL channels are SSL channels in which one end-point is authenticated. The term unilateral_conf_auth (C, SP, $ch_{C2SP}$) may be used to denote that a channel $ch_{C2SP}$ is a unilateral SSL channel used by the client 102 to send a message to the service provider 104. Also, the unilateral SSL channels and the DY channels may have a plurality of other channel properties that are well known to one of ordinary skill in the art.

Each security protocol entity (e.g., the service provider 104) in the security protocol may be represented using an Extended Finite State Machine (EFSM) model that uses the protocol message set L(A) as input and output alphabet. For example, the EFSM model may be represented as a tuple:

$$M = <S, s_0, A, CH, P(CH), X, T> \qquad \text{Equation (1)}$$

The parameter S is a finite set of states, $s_0 \in S$ is the initial state, A is a finite set of atoms, and L(A) is the set of messages formed using A, CH is a finite set of channels used to receive and send messages, P(CH) is a finite set of properties of the channel in the set CH, X is a finite set of state variables of type L(A) with default initial values, and T is a finite set of transitions. For example, for each $t \in T$, $t = <s, s', ch_i, i, ch_o, o, g, a>$ is a transition where s and s' are start and end states, $ch_i$, $ch_o \in CH$ are input and output channels, i, $o \in L(A)$ are input and output messages, g is a guard (or condition) on state variables and the input message, and a is an action on the state variables and input/output parameters. The elements of transition t can be referred to as s(t), $ch_i(t)$, and etc.

Figure 3:
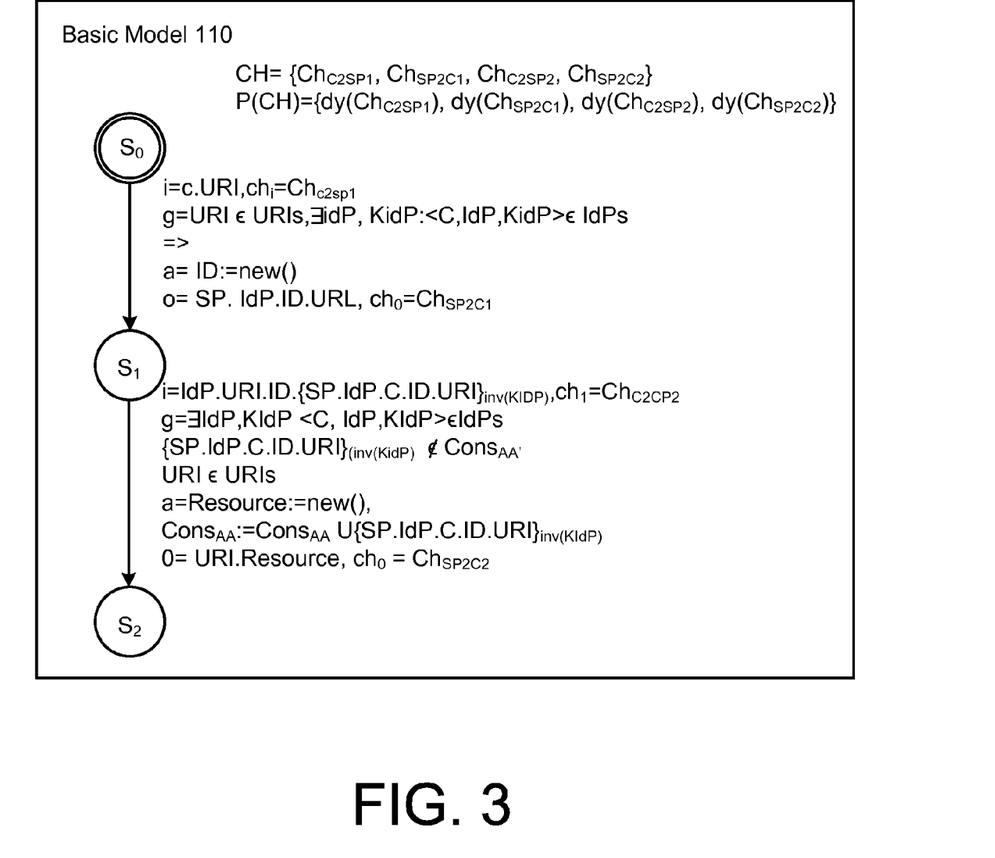
FIG. 3 illustrates a portion of a basic model of the security protocol according to an embodiment.

FIG. 3 illustrates a portion of the basic model 110 according to an embodiment. The portion illustrated in FIG. 3 relates to the basic model of the service provider 104. However, the basic model 110 that is inputted to the test case generator 114 would include the basic model of the identity providers 106 and the clients 102. In other words, the basic model 110 that is inputted to the test case generator 114 includes the basic model of the security protocol (e.g., all entities that comprise the protocol). Referring to FIG. 3, the basic model 110 of the service provider 104 includes a plurality of states $S_0$, $S_1$ and $S_2$. Also, as shown in FIG. 3, the service provider 104 uses a set of DY channels CH={$Ch_{C2SP1}$, $Ch_{SP2C1}$, $Ch_{C2SP2}$, $Ch_{SP2C2}$} for sending and receiving protocol messages. In the example of FIG. 3, the basic model 110 includes two transitions. First, from $S_0$ to $S_1$ in which the service provider 104 receives the message i=C·URI on the channel $Ch_{C2SP1}$ from the client 102, and second, from S1 to S2 in which the service provider 104 receives an authentication response i=IdP·URI·ID·{SP·IdP·C·ID·URI}$_{inv(KIdP)}$ over the channel $Ch_{C2SP2}$ from the identity provider 106.

With respect to the first transition, the guards g checks (i) whether the URI points to a resource the service provider 104 is hosting (the set URIs) and (ii) if the service provider 104 knows an identity provider 106 and the corresponding key KIdP to be used to authenticate the user C (<C, IdP, KIdP>∈IdPs). If the conditions are met (e.g., the guards are satisfied), then the service provider 104 generates a new unique identifier (ID:=new( )) and transmits the authentication request o=SP·IdP·ID·URI over the channel $Ch_{SP2C1}$.

With respect to the second transition, the service provider 104 receives an authentication response i=IdP·URI·ID·{SP·IdP·C·ID·URI}$_{inv(KIdP)}$ over the channel $Ch_{C2SP2}$. The service provider 104 checks if the message has been signed by a known identity provider 106, whether the authentication assertion has not been consumed (e.g., the set of consumed authentication assertion is $Cons_{AA}$), and whether or the URI is hosted by the service provider 104. If these conditions are met, then, the service provider 104 prepares the requested resource, marks the assertion as consumed, and transmits the resource over the channel $Ch_{SP2C2}$ to the client 102.

The same logic may be extended to the basic model 110 of the identity provider 106 and the client 102. As such, the basic model 110 inputted to the test case generator 114 may represent the security protocol as provided by all the security protocol entities associated with the security protocol.

As indicated above, the set of options 112 may be variations of the basic model 110. For example, the set of options 112 may describe a way to change the basic model 110. Formally, an option OP of the basic model M=<S, $s_0$, A, C H, P (CH), X, T> may be represented according to its type, as further explained below. According to one example, the set of options 112 may include a different type of channel property for a communication channel in the basic model 110, a different channel for receiving or sending a message in the basic model 110, a different type of input message used in the basic model 110, a different type of output message used in the basic model 110, and a different condition (e.g., guard) in the basic model 110. However, the embodiments encompass any type of variation of the basic model 110.

According to one example, the options 112 may include an option that has a different type of channel property. For example, as indicated above, the basic model 110 may include the channels $Ch_{C2SP1}$ and $Ch_{SP2C1}$, which may utilize a single plain-text TCP connection. If such a channel property is used, this type of channel property may be modeled as $dy(Ch_{C2SP1}) \in P$ (CH). According to an embodiment, this channel property may be changed from the single pain-text TCP type channel to the SSL type channel. By implementing this configuration option, the messages may be further secured. As such, the option 112 relating to this type of channel property may be modeled as follows: unilateral_conf_auth (C, SP, $Ch_{C2SP1}) \in P$ (CH). However, more generally, the channel property type option may be represented as: <ch, P(ch), q(ch)>, where ch∈CH, P(ch)⊆P(ch) and q(ch)∈/P(ch). Essentially, this general representation means that properties P(ch) of a channel ch are replaced by a new property q(ch), and the channel properties encompass any type of channel property associated with a communication channel.

According to another example, the options 112 may include an option that changes the communication channel for receiving a message (e.g., input is expected on a different channel). For example, as shown with respect to the basic model 110 of FIG. 3, the service provider 104 receives the resource access request on the communication channel $Ch_{C2SP1}$, and may expect the authentication response on a different channel, e.g., $Ch_{C2SP2}$. According to an embodiment, the options 112 may include an option that utilizes the same channel to receive messages from the client 102, in which the authentication response would be expected on the communication channel $Ch_{C2SP1}$. However, more generally, this type of option may be represented as <t, ch>, where t∈T, ch∈CH, and ch/=chi (t). Essentially, this general representation means that in transition t, input channel ch is used.

According to another example, the options 112 may include an option that utilizes a different type of output message (e.g. from the same state with the same input, different output is generated). For example, with respect to FIG. 3, the output message SP·IdP·ID·URI is not signed. According to an embodiment, the options 112 may include an option that signs the output message, e.g., providing an output message {SP·IdP·ID·URI}$_{inv(KSP)}$. However, more generally, this type of option may be represented as <t, o>, where t∈T, o∈L(A), and o/=o(t). This general representation means that in transition t, o is the output message.

According to another example, the options 112 may include an option that utilizes a different type of input messages (e.g., from the same state, different input is expected). For example, the service provider 104 may accept unsigned authentication responses. In the example of FIG. 3, the expected input is IdP·URI·ID·{SP·IdP·C·ID·URI}$_{inv(KIdPt)}$. According to an embodiment, the options 112 may include an option that requires a signed authentication response message, e.g., the input message {IdP·URI·ID·SP·IdP·C·ID·URI}$_{inv(KIdP)}$. However, more generally, this type of option may be represented as <t, i>, where t∈T, i∈L(A), and i/=i(t). This general representation means that in transition t, i is the input message.

According to another example, the options 112 may include an option that provides a different (additional) condition (e.g., a different guard is used in a transition). For example, in FIG. 3, the service provider 104 may not check whether the identity provider 106 and the URI in the authentication response message match the corresponding data in the authentication request message. According to an embodiment, the options 112 may include an option to perform such a check, e.g., a guard IdP=vIdP∧URI=vURI may be introduced in the transition. Also, it is noted that in order to simplify the representation of this type of option, all the elements of input/output messages are assumed to be stored in a state variable. However, more generally, this type of option may be represented as <t, g>, where t∈T and g/=g(t). This general representation means that in transition t, g is the guard.

As indicated above, the test case generator 114 may receive the basic model 110 and the set of options 112 and generate a test case from the basic model for each option of the set of options 112, and the test case execution engine 116 may execute each test case having a corresponding option and generate results for each test case indicating whether or not the corresponding option has been detected. For example, for option $OP_i$ (1≤i≤n) in <M, $OP_1$, $OP_2$, . . . , $OP_n$>, the test case generator 114 may generate the test cases according to the type of the option, and the test case execution engine 116 may be configured to execute the test cases, as explained below.

For example, with respect to the specific channel property option (e.g., <ch, P'(ch), q(ch)>), the test case execution engine 116 may obtain a path in the basic model 110 starting from state $s_0$ to state $s_{(t)}$ as the prefix of the test case, where ch is used in transition t. A prefix of a test case is the initial part of the test case. For example, a test case may be defined at t=<s_0, s_1, . . . , s_i, s_i+1, . . . s_n>. The prefixes of t may be <s_0>, <s_0, s_1>, <s_0, s_1, . . . , s_i>, and then until <s_0, s_1, . . . , s_i, s_i+1, . . . s_n−1>. The final test case may be considered a concatentation of 2 parts: the sequence <s_0, . . . , s(t)> (e.g., the prefix of the final test case) followed by at least one check q(ch).

Then, the test case execution engine 116 may check the status of q(ch). The check of q(ch) depends on the transition t and the availability of SAML metadata. If metadata is available and the transition t involves a protocol end-point, then the test case execution engine 116 may check the status of q(ch) by verifying whether the declaration of the HTTP endpoint is of the type HTTPS. If the test case execution engine 116 verifies that the declaration of the HTTP endpoint is of the type HTTPS, the test case execution engine 116 may generate a verdict 118 that indicates that this channel property option has been detected. On the other hand, if the test case execution engine 116 does not verity that the declaration of the HTTP endpoint is of the type HTTPS, the test case execution engine 116 may generate a verdict 118 that indicates that this channel property option has not been detected.

With respect to the expectation of input on a different channel option (e.g., $<t, ch'_i>$), the test case execution engine 116 may obtain a path in the basic model 110 starting from state $s_0$ to state $s_{(t)}$ as the prefix of the test case, and provide the expected input i(t) in the channel $ch_i$. In this way, the test case execution engine 116 may check whether or not the input is accepted. If the test case execution engine 116 determines that the input is accepted, the test case execution engine 116 may generate a verdict 118 that indicates that this configuration option has been detected. However, if the test case execution engine 116 determines that the input is not accepted, the test case execution engine 116 may generate a verdict 118 that indicates that this configuration option has not been detected.

With respect to the different type of output option (e.g., $<t, o'>$), the test case execution engine 116 may obtain a path in the basic model 110 starting from state $s_0$ to state $s_{(t)}$ as the prefix of the test case, and provide the expected input i(t). Then, the test case execution engine 116 may check whether or not the output is o. If the test case execution engine 116 determines that the output is o, the test case execution engine 116 may generate a verdict 118 indicating that this configuration option has been detected. However, if the test case execution engine 116 determines that the output is not o, the test case execution engine 116 may generate a verdict 118 indicating that this configuration option has not been detected.

With respect to the different type of input option (e.g., $<t, i'>$), the test case execution engine 116 may obtain a path in the basic model 110 starting from state $s_0$ to state $s_{(t)}$ as the prefix of the test case, and provide the input i. Then, the test case execution engine 116 may be configured to check whether or not the input is accepted. If the test case execution engine 116 determines that the input is accepted, the test case execution engine 116 may generate a verdict 118 indicating that this configuration option has been detected. However, if the test case execution engine 116 determines that the input is not accepted, the test case execution engine 116 may generate a verdict 118 indicating that this configuration option has not been detected.

With respect to the different type of condition (e.g., $<t, g'>$), the test case execution engine 116 may obtain a path in the basic model 110 starting from state $s_0$ to state $s_{(t)}$ as the prefix of the test case, and provide the input i(t). The test case execution engine 116 may be configured to select data values to satisfy g but not g(t). Then, the test case execution engine 116 may be configured to check whether or not the input is accepted and whether or not the output (if any) is accepted. If the test case execution engine 116 determines that the input/output are accepted, the test case execution engine 116 may generate a verdict 118 indicating that this configuration option has been detected. However, if the test case execution engine 116 determines that the input/output are not accepted, the test case execution engine 116 may generate a verdict 118 indicating that this configuration option has not been detected.

Then, the model synthesizer 120 may be configured to update the basic model 110 with one or more options that have been detected, and provide the updated basic model 122. For instance, assuming the basic model is M=$<S, s_0, A, CH, P(CH), X, T>$ and the options implemented are $OPI_1$, $OPI_2, \ldots, OPI_k$, after knowing which options are detected, a model of the specific implementation is synthesized by updating the basic model according to the type of each option implemented $OPI_i$, $(1 \le i \le k)$. For example, If $OPI_i=<ch, P'(ch), q(ch)>$, the model synthesizer 120 may update P(CH) to be $P(CH) \backslash P'(CH) \cup \{q(ch)\}$. If $OPI_i=<t, ch'_i>$, the model synthesizer 120 may update $ch_i(t)$ to $ch'_i$. If $OPI_i=<t, o'>$, the model synthesizer 120 updates o(t) to o'. If $OPI_i=<t, i'>$, the model synthesizer 120 updates i(t) to i'. If $OPI_i=<t, g'>$, the model synthesizer 120 updates g(t) to g'.

The model checker may be configured to check whether expected security properties are satisfied in the updated basic model 122. For example, the updated model 122 of the protocol entity implemented may be provided to the model checker to check whether the expected security properties are satisfied by the composed system including the protocol entity implementations.

FIG. 4 illustrates a portion of the updated model 122 according to an embodiment. In the example of FIG. 4, the first transition includes the same information as FIG. 3 except the output message o(t) is updated with o'. For example, the option $OPI_i=<t, o'>$ with transition t from $s_0$ to $s_1$, the output o is a signed authentication request $\{SP \cdot IdP \cdot ID \cdot URI\}_{inv(KSP)}$. By updating the output message o(t) with o', the model synthesizer 120 has obtained the updated model 122, as shown in FIG. 4. As may be appreciated, the updated model 122 may include any option that has been detected by the test case execution engine 116.

Figure 5:
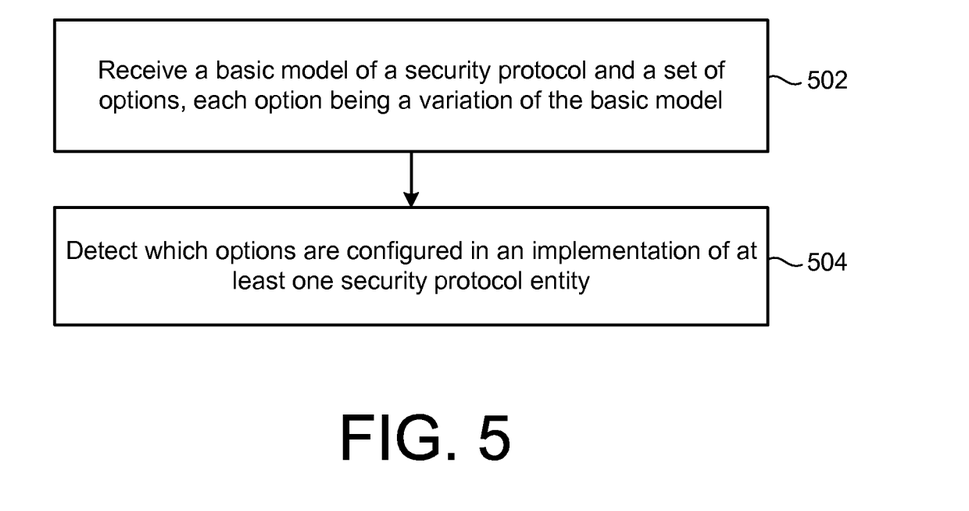
FIG. 5 is a flowchart illustrating example operations of the option detector according to an embodiment.

FIG. 5 is a flowchart illustrating example operations of the options detector 108 according to an embodiment. Although FIG. 5 is illustrated as a sequential, ordered listing of operations, it will be appreciated that some or all of the operations may occur in a different order, or in parallel, or iteratively, or may overlap in time.

A basic model of a security protocol and a set of options may be received, where each option may be a variation of the basic model (502). For example, the options detector 108 that is configured to receive a basic model 110 of the security protocol and a set of options 112. The basic model 110 of the security protocol may include the basic model of the entities that comprise the security protocol such as the clients 102, the service providers 104 and the identity providers 106. The set of options 112 may be options to be detected in an implementation of one or more security protocol entities. For example, the set of options 112 may be variations of properties of a communication channel between the entities, the use of different communication channels for receiving various inputs/outputs, the generation of different types of output messages (e.g., a signed output message vs. an unsigned output message), the receiving of different types of input messages (e.g., receiving signed responses vs. receiving unsigned responses), and/or using different types of guards (or conditions) for evaluating responses. More generally, each option of the set of options 112 may be a variation of the basic model, which may be virtually any type of configuration option.

Configuration options may be detected in an implementation of at least one security protocol entity (504). For example, the options detector 108 may be configured to detect which options among the set of options 112 are configured in the implementation of one or more of the security protocol entities 101 such as the service providers 104 and the identity providers 106. In particular, the options detector 108 may include the test case generator 114 and the test case execution engine 116. The test case generator 114 may be configured to receive the basic model 110 and the set of options 112 and generate a plurality of test cases. For instance, the test case generator 114 may be configured to extract a test case from the basic model for each option of the set of options 112, where each test case corresponds to a different option in the set of options 112. In one embodiment, the test case generator 114 generates a test case from the basic model for a given option according to a model checker technique. For example, the model checker technique may refer to a technique for automatically verifying correctness of properties in a finite-state system. In particular, given a model of the system, the test case generator 114/test case execution engine 116 may automatically test whether this model having the option meets a given specification. However, other techniques or algorithms besides the model checker technique may be utilized by the test case generator 114.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus for detecting configuration options, the apparatus comprising:
  at least one processor;
  a non-transitory computer-readable storage medium including instructions executable by the at least one processor, the instructions configured to implement,
  an option detector configured to receive a basic model of a security protocol for at least one security protocol entity, the at least one security protocol entity including a client, a service provider, and an identity provider, the basic model including parameters associated with the security protocol for the client, the service provider, and the identity provider, the parameters including a first parameter, a second parameter, and a third parameter,
  the option detector configured to receive a set of options, the set of options being variations of the parameters of the basic model, the set of options including a first option that is a variation of the first parameter, a second option that is a variation of the second parameter, and a third option that is a variation of the third parameter,
  the option detector configured to detect which of the options within the set of options are used within an implementation of the security protocol including generating a first test case configured to detect the first option within the implementation of the at least one security protocol entity, a second test case configured to detect the second option within the implementation of the at least one security protocol entity, and a third test case configured to detect the third option within the implementation of the at least one security protocol entity, and independently executing each of the first, second, third test cases to determine whether or not the first option, the second option, and the third option exist within the security protocol,
  wherein the option detector is configured to determine that the third option is found within the implementation of the at least one security protocol entity based on the execution of the third test case, the option detector being configured to update the basic model with the third option by replacing the third parameter with the variation of the third parameter represented by the third option.

2. The apparatus of claim 1, wherein the service provider has a Security Assertion Markup Language (SAML) protocol.

3. The apparatus of claim 1, wherein the identity provider has a Security Assertion Markup Language (SAML) protocol.

4. The apparatus of claim 1, wherein the first parameter is a communication channel of a first type for communicating a security protocol message from or to the at least one security protocol entity, and the variation of the first parameter is a communication channel of a second type for communicating the security protocol message from or to the at least one security protocol entity, wherein the second parameter is an input message of a first type that is received by the at least one security protocol entity, and the variation of the second parameter is an input message of a second type that is received by the at least one security protocol entity.

5. The apparatus of claim 4, wherein the communication channel of the first type includes a Dolev-Yao channel, and the communication channel of the second type includes a unilateral Secure Socket Layer (SSL) channel.

6. The apparatus of claim 1, wherein the option detector is configured to determine that the first option is not found within the implementation of the at least one security protocol entity based on the execution of the first test case, and the option detector is configured to not update the basic model with the first option such that the first parameter remains in the basic model.

7. The apparatus of claim 1, wherein the client is configured to request access to a resource provided by the service provider, the identity provider is configured to authenticate the client and generate an authentication assertion, and the service provider is configured to use the authentication assertion and provide the client with access to the requested resource, the parameters of the basic model representing security properties for processing protocol messages via communication channels among the client, the service provider, the identity provider.

8. A method for detecting configuration options performed by one or more processors, the method comprising:
receiving a basic model of a security protocol for at least one security protocol entity, the at least one security protocol entity including a client, a service provider, and an identity provider, the basic model including parameters associated with the security protocol for the client, the service provider, and the identity provider, the parameters including a first parameter, a second parameter, and a third parameter;
receiving a set of options, the set of options being variations of the parameters of the basic model, the set of options including a first option that is a variation of the first parameter, a second option that is a variation of the second parameter, and a third option that is a variation of the third parameter;
detecting which of the options within the set of options are used within an implementation of the security protocol including,
generating a first test case configured to detect the first option within the implementation of the at least one security protocol entity, a second test case configured to detect the second option within the implementation of the at least one security protocol entity, and a third test case configured to detect the third option within the implementation of the at least one security protocol entity;
independently executing each of the first, second, and third test cases to determine whether or not the first option, the second option, and the third option exist within the security protocol; and
determining that the third option is found within the implementation of the at least one security protocol entity based on the execution of the third test case; and
updating the basic model with the third option by replacing the third parameter with the variation of the third parameter represented by the third option.

9. The method of claim 8, wherein the service provider has a Security Assertion Markup Language (SAML) protocol.

10. The method of claim 8, wherein the identity provider has a Security Assertion Markup Language (SAML) protocol.

11. The method of claim 8, wherein the first parameter is an output message of a first type that is outputted by the at least one security protocol entity, and the variation of the first parameter is an output message of a second type that is outputted by the at least one security protocol entity, wherein the second parameter indicates not to perform a guard check on an authentication request message and an authentication response message, and the variation of the second parameter indicates to perform the guard check.

12. The method of claim 8, wherein the basic model includes at least a first state and a second state, and a transition between the first state and the second state, the transition relating to receiving or outputting a message via a communication channel, the transition being associated with the parameters of the security protocol.

13. The method of claim 12, wherein the first test case includes a path in the basic model from the first state to the second state with a check configured to check for the first option, and the second test case includes a path in the basic model from the first state to the second state with a check configured to check for the second option.

14. The method of claim 8, further comprising:
determining that the first option is found within the implementation of the at least one security protocol entity based on the execution of the first test case;
updating the basic model with the first option including replacing the first parameter with the variation of the first parameter represented by the first option.

15. A computer program product tangibly embodied on a non-transitory computer-readable storage medium and including executable code that, when executed, is configured to cause a data processing apparatus to:
receive a basic model of a security protocol for at least one security protocol entity, the at least one security protocol entity including a client, a service provider, and an identity provider, the basic model including parameters associated with the security protocol for the client, the service provider, and the identity provider, the parameters including a first parameter, a second parameter, and a third parameter;
receive a set of options, the set of options being variations of the parameters of the basic model, the set of options including a first option that is a variation of the first parameter, a second option that is a variation of the second parameter, and a third option that is a variation of the third parameter;
detect which of the options within the set of options are used within an implementation of the security protocol including, generate a first test case configured to detect the first option within the implementation of the at least one security protocol entity, a second test case configured to detect the second option within the implementation of the at least one security protocol entity, and a third test case configured to detect the third option within the implementation of the at least one security protocol entity;

independently execute each of the first, second, and third test cases to determine whether or not the first option, second option, and the third option are found within the security protocol; and determine that the third option is found within the implementation of the security protocol based on the execution of the third test case; and update the basic model based on results of the first, second, and third test cases including update the basic model with the third option by replacing the third parameter with the variation of the third parameter represented by the third option.

16. The computer program product of claim 15, wherein the service provider has a Security Assertion Markup Language (SAML) protocol.

17. The computer program product of claim 15, wherein the service identity has a Security Assertion Markup Language (SAML) protocol.

18. The computer program product of claim 15, wherein the basic model includes a first state, a second state, a third state, a first transition between the first state and the second state, and a second transition between the second state and the third state, the first transition relating to receiving a message at the service provider from the client, the second transition relating to receiving an authentication message at the service provider from the identity provider, the first parameter being a security property relating to the first transition, the second parameter being a security property relating to the second transition.

19. The computer program product of claim 15, further comprising:

determine that the first option is found within the implementation of the at least one security protocol entity based on the execution of the first test case;

determine that the second option is not found within the implementation of the at least one security protocol entity based on the execution of the second test case;

update the basic model with the first option but not the second option including replacing the first parameter with the variation of the first parameter represented by the first option.

20. The computer program product of claim 15, wherein the basic model includes an Extended Finite State Machine (EFSM) model representing the at least one security protocol entity.

* * * * *